United States Patent [19]

Ganz et al.

[11] 4,199,288

[45] Apr. 22, 1980

[54] INFINITELY VARIABLE SPACING FEEDER

[75] Inventors: Robert H. Ganz, Saddle River; Frank Conley, Bergenfield, both of N.J.

[73] Assignee: Ganz Brothers, Inc., Bergenfield, N.J.

[21] Appl. No.: 811,980

[22] Filed: Jul. 25, 1977

[51] Int. Cl.² .......................................... B65G 47/90
[52] U.S. Cl. .................... 414/128; 414/680; 414/736; 414/737; 198/441; 198/722; 198/803; 414/749
[58] Field of Search ............... 214/1.6, 1.7, 8.5 D, 214/1 B, 1 BA, 1 BS, 1 BC, 1 BH, 1 BD, 1 BV, 1 S, 8.5 C, 147 T, 147 B; 198/441, 722, 459, 803; 221/211, 217; 269/57; 414/128, 680, 736, 737, 749

[56] References Cited

U.S. PATENT DOCUMENTS

| 3,805,943 | 4/1974 | Warren | 214/1 BV X |
| 3,858,547 | 1/1975 | Bergfelt | 269/57 X |
| 3,929,234 | 12/1975 | Warren | 214/1 BV |

FOREIGN PATENT DOCUMENTS 554905  7/1943  United Kingdom ................ 214/8.5 D

*Primary Examiner*—Frank E. Werner
*Attorney, Agent, or Firm*—Charles E. Brown

[57] ABSTRACT

This relates to a feeder for feeding articles on a continuous basis one behind the other. The feeder includes a plurality of flight bars which are mounted for rotation about an axis with the flight bars being circumferentially spaced and having article engaging elements carried thereby. The flight bars are so mounted wherein the distances of the flight bars from the axis of rotation may be infinitely varied to thereby infinitely vary the circumferential spacing between adjacent flight bars. In this manner, the feeder may be readily adjusted so as to feed articles of all dimensions within a prescribed range.

15 Claims, 14 Drawing Figures

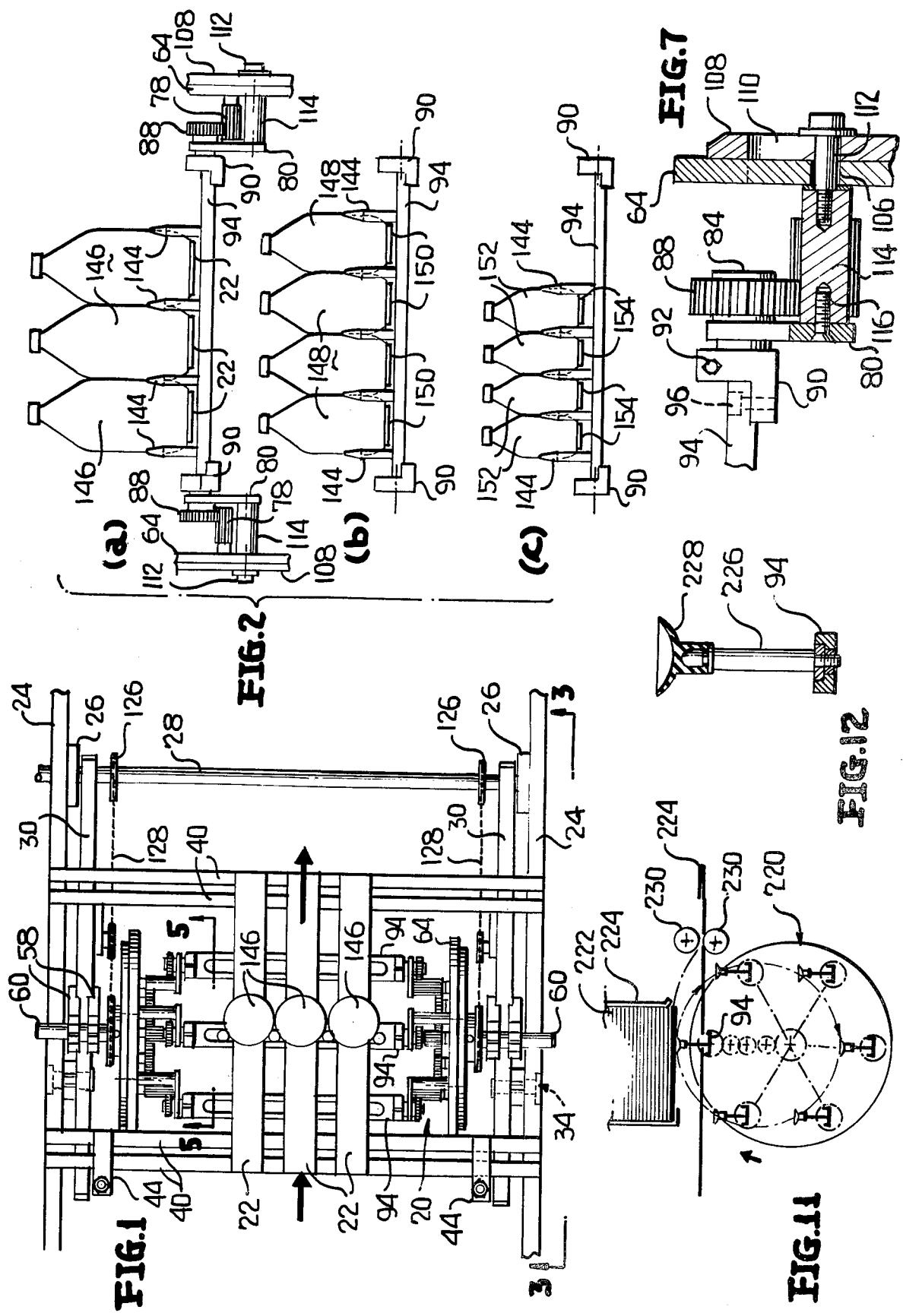

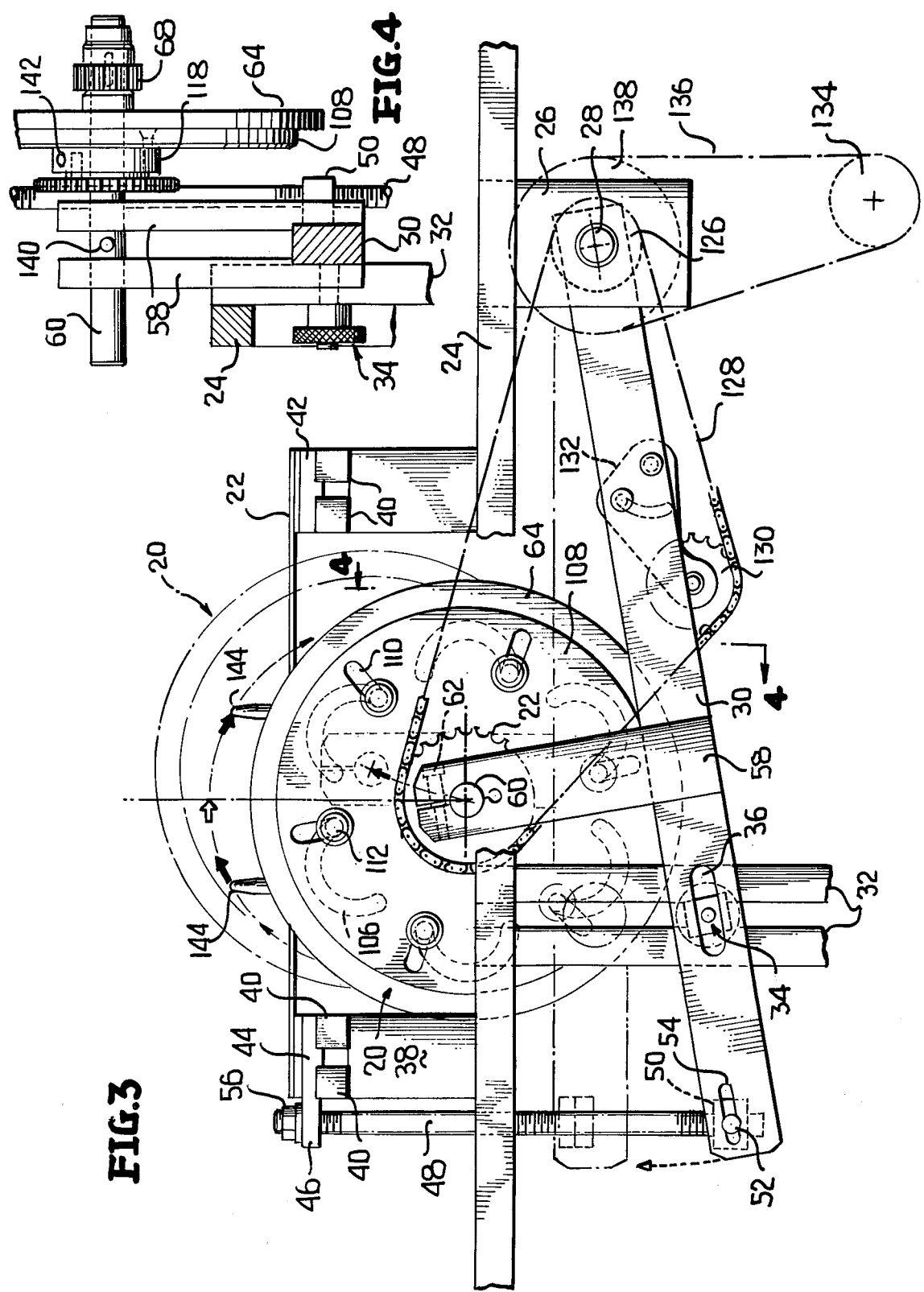

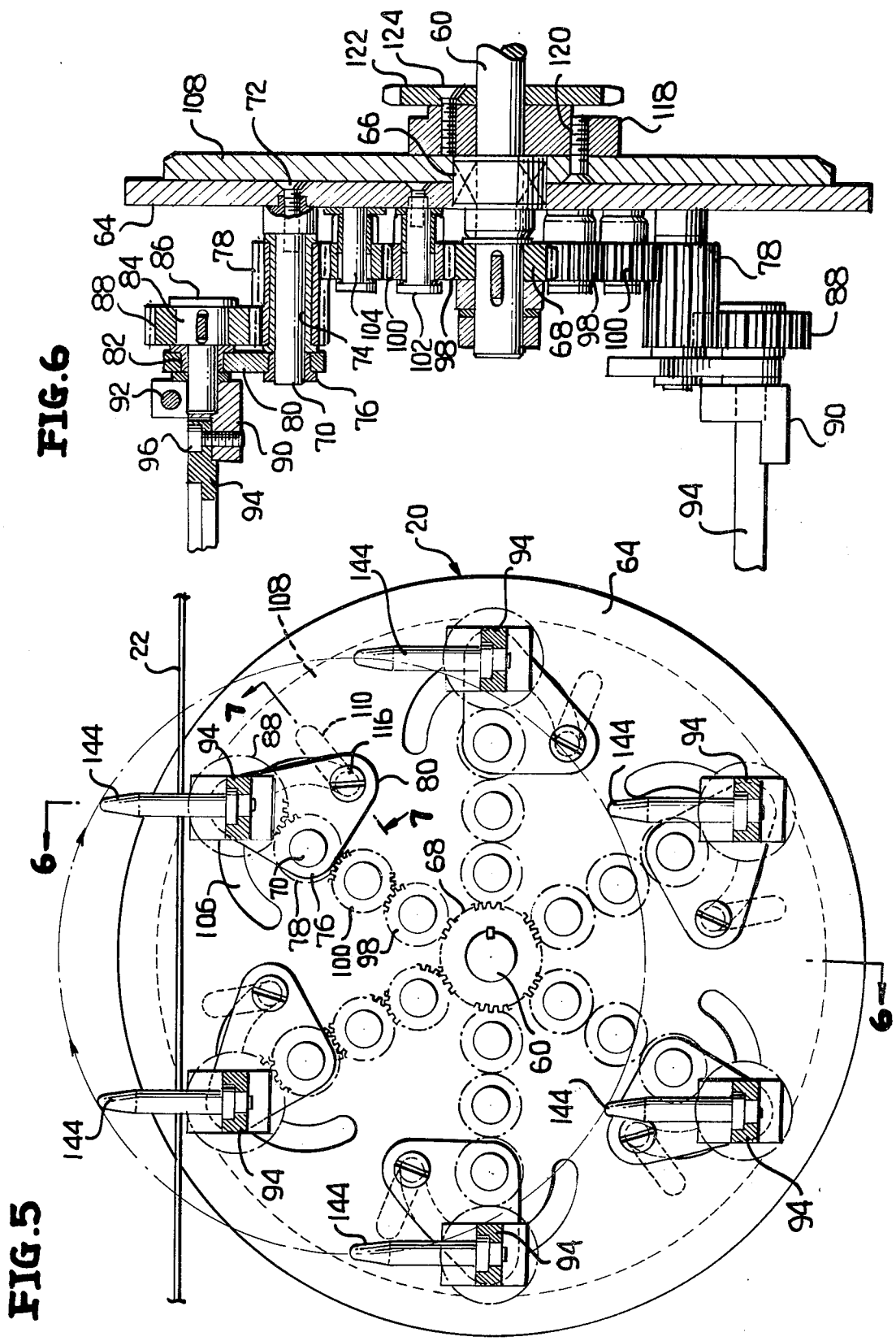

INFINITELY VARIABLE SPACING FEEDER

This invention relates in general to new and useful improvements in feeders and more particularly to a feeder which is infinitely variable as to the spacing of feed elements thereof.

BACKGROUND OF INVENTION

Most particularly, this invention relates to a feeder which includes a plurality of flight bars mounted for rotation about an axis. Each flight bar carries article engaging elements. These elements may be in the form of suction heads for feeding sheet material or may be in the form of pins for moving articles along an article support. Plural article engaging elements may be carried by each flight bar and the article engaging elements may be mounted on their respective flight bar for adjustment therealong transversely of the direction of movement of the flight bars.

SUMMARY OF INVENTION

A primary feature of the invention is the mounting of the flight bars so that the distance of each flight bar from the common axis of rotation may be varied wherein the spacing between adjacent flight bars may be readily varied to thereby compensate for variations in sizes of articles to be conveyed while at the same time assuring a continuous conveyance of articles in closely adjacent relation.

The means for adjusting the spacing of the flight bars are connected to all the flight bars so that the spacing of all the flight bars is simultaneously adjusted.

Another feature of the invention is that the orientation of the flight bars remain constant during the rotation so that the orientation of the article engaging elements remain constant at all times.

Most particularly, the feeder has to do with a pair of opposed plates which are mounted for rotation about a common axis and wherein the plates have mounted on opposed surfaces thereof plural gear means drivable from a stationary sun gear so as to effect rotation of the flight bars as the flight bars rotate about the common axis so as to maintain the fixed orientation of the flight bars.

Another feature of the invention is that each flight bar is carried by a support which is rockable about an axis of an associated drive gear so as to move the flight bar inwardly or outwardly with respect to the drive gear axis so that the spacing of the flight bar with respect to the common axis of rotation may be varied, thus varying the circumferential spacing of the flight bars.

A further feature of the invention is that a common adjusting plate is provided for adjusting all of the flight bar supports simultaneously with the flight bars being shifted simuntaneously to vary the spacing thereof while maintaining the relative orientation of the flight bars constant.

Yet another feature of the feeder is that the entire feeder is readily mounted for adjustment so that as the spacing of the flight bars from the common center is adjusted, the feeder may be likewise adjusted so that the relationship of the flight bars with respect to an article support may be adjusted to compensate for the change in position of the flight bars and thus maintain a preset relationship between the flight bars and a fixed article support.

Yet another feature of the invention is that when the orientation of the flight bars is changed during the adjusting of the spacing thereof, the support for the flight bars may be adjusted to bring the flight bars back to an initial orientation with a minimum of effort.

With the above, and other objects in view that will hereinafter appear, the nature of the invention will be more clearly understood by reference to the following detailed description, the appended claims and the several views illustrated in the accompanying drawings.

In the drawings:

FIG. 1 is a plan view of the feeder showing the same being utilized for the purpose of moving containers along fixed container supports.

FIG. 2a is a fragmentary transverse elevational view showing a flight bar carrying pins adjusted to receive large size containers.

FIG. 2b is a view similar to FIG. 2a showing the pins adjusted for feeding intermediate size containers.

FIG. 2c is another view similar to FIG. 2a showing the pins of a flight bar adjusted for feeding small size containers.

FIG. 3 is an end elevational view on an enlarged scale taken generally along the line 3—3 of FIG. 1 and shows the mounting of the feeder and the manner in which it may be adjusted vertically to compensate for a change in the spacing of the flight bars.

FIG. 4 is an enlarged fragmentary sectional view taken along the line 4—4 of FIG. 3 and shows further the mounting details of the feeder.

FIG. 5 is an enlarged fragmentary vertical sectional view taken along the line 5—5 of FIG. 1 and shows specifically the mounting and driving of the flight bars.

FIG. 6 is an enlarged fragmentary vertical sectional view taken along the line 6—6 of FIG. 5 and shows more specifically the details of the mounting and driving of the flight bars.

FIG. 7 is an enlarged fragmentary sectional view taken along the lines 7—7 of FIG. 5 and shows the specific manner in which a flight bar support is adjusted and maintained in an adjusted position.

FIG. 11 is a schematic side elevational view showing the manner in which the feeder may be utilized for feeding blanks continuously one after another.

FIG. 12 is an enlarged fragmentary sectional view showing generally the details of an article engaging element when the same is in the form of a blank feeder.

DESCRIPTION OF INVENTION

Figure 8:
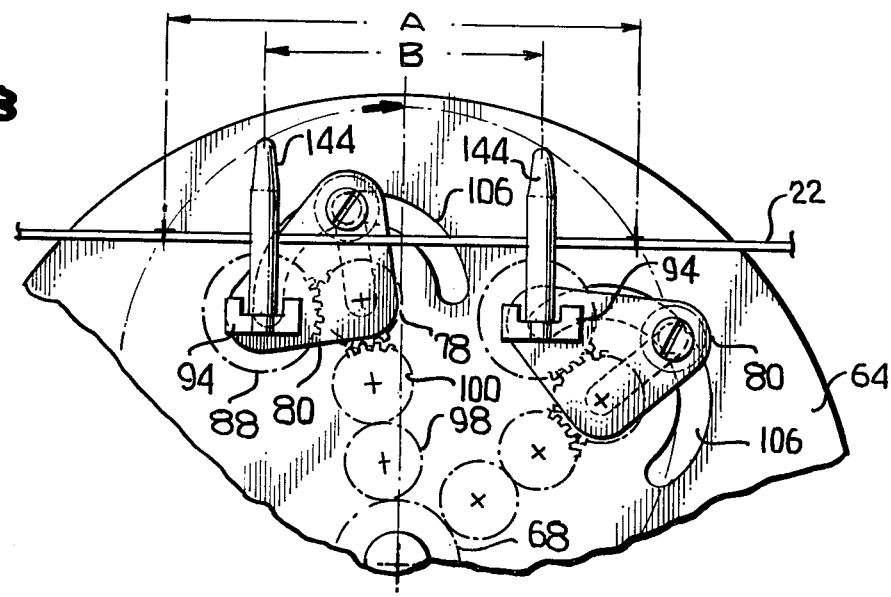
FIG. 8 is an enlarged fragmentary schematic elevational view similar to the upper part of FIG. 5 showing the flight bars adjusted to an intermediate spacing relationship as opposed to the wide spacing relationship of FIG. 5.

Referring now to the drawings in detail, it will be seen that there is illustrated in FIG. 3 a preferred embodiment of the feeder, the feeder being generally identified by the numeral 20. It is to be understood that the feeder 20, as illustrated in FIGS. 1 through 10, is utilized for moving articles, such as containers, in predetermined spaced relation along predetermined paths, the paths of the article being defined by article supports 22.

The feeder 20 is carried by a suitable frame which, among other elements, includes a pair of longitudinally extending frame rails 24 which are suitably transversely connected in a manner not illustrated and not forming a part of this invention. The frame rails 24 are provided with depending support plates between which extends a transverse shaft 28 which is suitably rotatably journalled relative to the support plates 26. A pair of arms 30 are rotatably journalled on the shaft 28 and extend to the left, as viewed in FIG. 3.

The framework includes dual upstanding supports 32 on each side thereof and each arm 30 is stabilized relative to the upright supports 32 by means of a fitting, generally identified by the numeral 34. As is apparent from FIG. 3, each arm 30 has an elongated slot 36 formed therein in which a portion of the fitting 34 is received. The fitting 34 is vertically movable between the pair of supports 32 and when tightened down, tightly clamps the respective arm 30 against the faces of the supports 32 in a vertically adjusted position. The frame rails 24 each carry a pair of longitudinally spaced upstanding members 38 with the upstanding members 38 of the two frame rails being transversely aligned. Extending between each pair of upstanding supports 38 is a pair of spaced transverse frame members 40 which carry plural mounting plates 42. The mounting plates 42 are transversely adjustable on the frame member 40 and certain of the mounting plates carry the article supports 22 which are in the form of elongated plates, as is best shown in FIG. 1. It is to be understood that the mounting plates 42 are transversely adjustable as are the article supports 22.

The frame members 40 remote from the shaft 28 also carry mounting plates 44 which extend to the left and which carry adjusting screws 48. Nuts 50 are threaded on the lower portions of the adjusting screws 48 with the nuts 50 being connected to the arms 30 by means of pins 52 which extend through slots 54 in the arms, the slots 54 compensating for the change in distance between the shaft 28 and the screws 48 as the arms 30 move up or down. The screws 48 are rotated by means of nut elements 56 secured to their upper ends.

Each of the arms 30 has secured to the inner and outer faces thereof a pair of upstanding supports 58. The feeder 20 is carried by the supports 58 for vertical adjustment movement by the arms 30 and the adjusting screws 48.

As is clearly shown in FIG. 3, each of the supports 48 has a split upper end portion and carried by each pair of supports 58 is a stub shaft 50. Each stub shaft 60 is fixedly secured in the supports 58 against rotation by a clamping screw 62 which urges together the split ends of the supports 58 into tight engagement around the respective stub shaft 60. However, when the clamping screws 62 are released, the stub shafts 60 may be rotated within their respective supports 58 for the purpose of orienting the flight bars in a manner to be described hereinafter.

Referring now to FIG. 6, it will be seen that each stub shaft 60 has rotatably journalled thereon a carrier plate 64 by means of a bearing 66. Each stub shaft 60 has fixedly keyed thereto a sun gear 68.

It is to be understood that the feeder 20 includes a plurality of flight bars which will be described hereinafter. For each flight bar there is a gear train. In the illustrated embodiment of the invention there are six flight bars and thus six gear trains. With respect to each flight bar and its respective gear train, there is carried by the carrier 64 a shaft 70 which in the illustrated embodiment of the invention is secured to the carrier 64 by a threaded fastener 72. Each shaft 70 has rotatably journalled thereon an inner bearing sleeve 74 and an outer bearing sleeve 76. The bearing sleeve 74 carries an axially elongated gear 78. The bearing sleeve 76 carries a generally triangular support plate 80. As is best shown in FIG. 5, it will be seen that the bearing sleeve 76 is disposed at one corner of the support plate 80.

Carried by each support plate 80 adjacent a second corner thereof is a combined bearing sleeve and spacer 82 in which a short shaft 84 is rotatably journalled. The shaft 84 is provided adjacent one end with an enlarged head 86 and that end of the shaft is provided with a drive gear 88 for rotating the shaft 84. The drive gear 88 is meshed with the drive gear 78. The opposite end of the shaft 84 is received in an angular cross section mounting block 90 which is of a partially split construction and which is provided with a clamp screw 92 through the split portion thereof so as to clamp the mounting block 90 on the shaft 84 in fixed angular relation with respect thereto.

At this time it is pointed out that the two carriers 64 carried by the two stub shafts 60 are in like orientation so that mounting blocks 90 carried by the two carriers 64 are in opposed aligned relation. Flight bars 94 extend between the pairs of mounting blocks 90 and are removably secured thereto by means of threaded fasteners 96.

In order that the drive gear 78 may be driven from the sun gear 68, there are intermediate gears 98 and 100, the gear 98 meshing with the sun gear 68 and the gear 100 meshing with the gear 98 and the gear 78. It is to be noted that the gears 98 and 100 are carried by headed shafts 102 and 104 respectively fixedly carried by the carrier 64.

It is to be understood that the gears 88 are to maintain a constant orientation with respect to the sun gear 68 even though they are rotated about the sun gear by the carrier 64. In order to accomplish this, it is necessary that there be an odd number of gears intermediate the sun gear 66 and the drive gears 88.

It will be readily apparent from FIG. 5 that if a mounting plate 80 is pivoted about its respective shaft 70, the shaft 84 carried thereby, and accordingly the flight bar 94 carried by the shaft 84, will swing in an arc about the axis of the shaft 70 so as to move the shaft 74 inwardly or outwardly with respect to the shaft 60. It will also be readily apparent that when the shafts 84 and the flight bars 94 carried thereby are in their outermost positions, the spacing between adjacent flight bars 94 will be at a maximum. On the other hand, when the shafts 84 and the flight bars 94 are swung to their innermost positions, the spacing between adjacent flight bars 94 will be at a minimum.

In order to permit the controlled positioning of the mounting plates 80, each mounting plate 80 is provided with means for retaining it in an adjusted position. This means, as is best illustrated in FIGS. 5 and 7, includes an arcuate slot 106 formed through the carrier 64. Disposed outwardly of the carrier 64 and mounted for rotation on the shaft 60 therewith is a control plate 108. The control plate 108 is provided with a radial slot 110 which intersects the arcuate slot 106. A headed fastener 112 extends through the intersecting slots 106, 110 and is threaded into a combined connector and spacer 114. The combined connector and spacer 114 is, in turn, secured to the mounting plate 80 at the third corner thereof by means of a fastener 116.

It is to be understood that by loosening all of the fasteners 112, and by rotating the two plates 108 simultaneously, all of the mounting plates 80 can be rotated in unison about their respective shafts 70 the same amount so as to vary the radial distances between the shafts 60 and 84 and thus vary the spacing between adjacent flight bars 94. It is to be understood that when the fasteners 112 are again tightened down, the plates 108 will be clamped against the carrier 64 and maintained in their adjusted positions.

Referring now to FIGS. 5, 8, 9 and 10, it will be seen that when the fasteners 112 are in the right ends of their arcuate slots, the flight bars 94 are the most widely separated and as the fasteners 112 are moved in a counterclockwise direction, the mounting plates 80 rotate in a counterclockwise direction and the flight bars 94 move both circumferentially and radially inwardly. At the same time, the fasteners 112 move first radially outwardly in the slots 110 and then back radially inwardly as shown by a comparison of FIGS. 5, 8 and 9. With respect to FIG. 10, it will be seen that there is schematically illustrated the positions of the flight bars and the greatest spacing adjustment thereof in solid lines and the flight bars in their minimum adjusting positions in dotted lines. It is to be understood that since there are no stops, the plates 108 may be minutely adjusted with respect to the carrier 64 and thus the spacing of the flight bars 94 may also be minutely or infinitely adjusted between the extremes of spacing.

Figure 9:
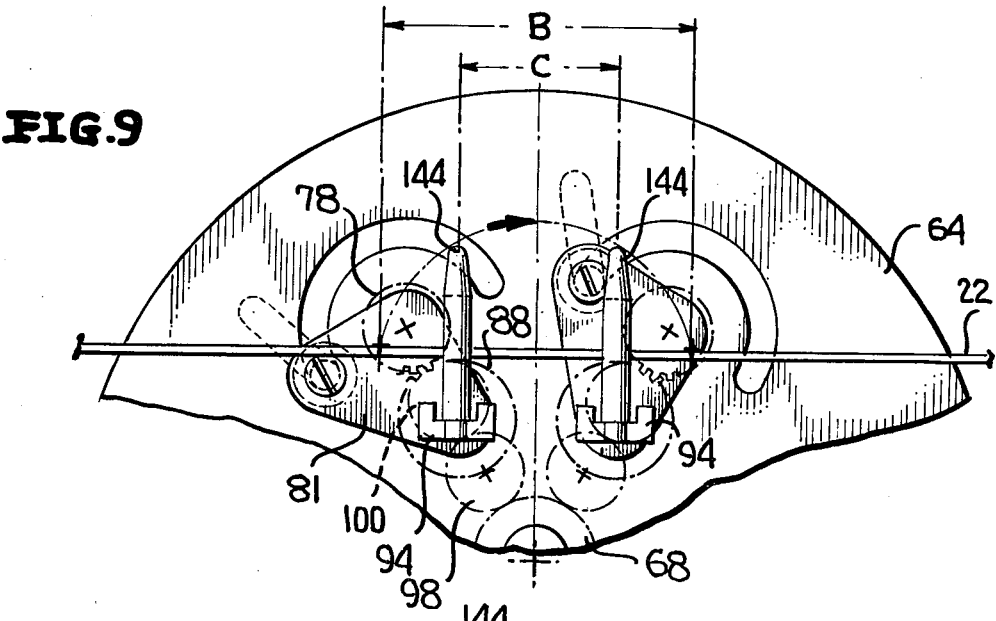
FIG. 9 is a view similar to FIG. 8 and shows the spacing of the flight bars adjusted to their closest position.
Figure 10:
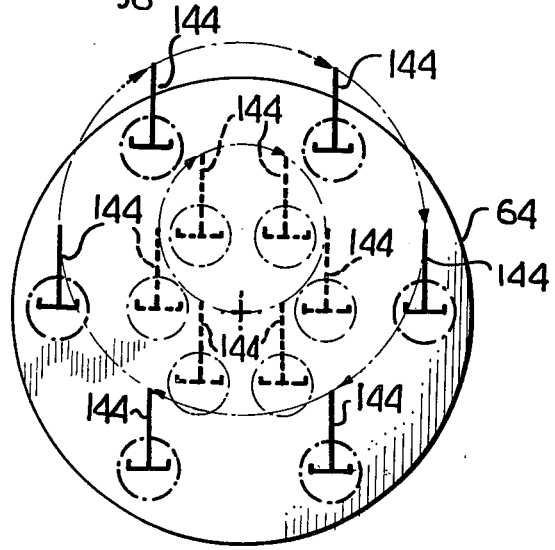
FIG. 10 is a schematic view showing the placement of the flight bars and the article engaging elements carried thereby in two adjusted positions of the flight bars.

With further reference to FIGS. 8 and 9, it will be seen that the maximum spacing of the flight bars when in their widest spaced position as shown in FIG. 5 will be a distance A. The spacing of the same flight bars in their intermediate position will be a distance B. Finally, in their closest spaced condition as shown in FIG. 9, the spacing of the same flight bars will be a distance C.

At this time it is pointed out that when the spacing of the flight bars 94 is adjusted, the mounting plates 80, of course, pivot about their respective shafts 70. The net result is that the gears 88 rotate relative to the gears 78 and thus the flight bars 94 assume a rotated position with respect to their previous orientation. The flight bars 94 are readily reorientated by loosening the clamping screws 62 of the supports 58 and turning the stub shafts 60 so as to rotate the sun gear 68 and thus rotate the gears 88, the shafts 84 and the flight bars 94 back to their original orientation.

In order to effect rotation of the feeder 20, there is secured to each of the plates 108 a drive hub 118 by means of fasteners 120. A drive sprocket 122 is, in turn, secured to its respective drive hub 118 by fasteners 124.

The carriers 64, of course, rotate with the plates 108. The drive sprockets 124 are rotated in unison by the rotation of the shaft 28 which carries spaced sprockets 126. Each sprocket 126 is aligned with its respective drive sprocket 122 and is coupled thereto by means of a drive chain 128. Each drive chain 128 is tensioned by an idler 130 carried by a bracket 132 adjustably mounted on the respective arm 30. The shaft 28, in turn, is driven by means of a main drive sprocket 134 through a chain 136 and a sprocket 138 secured to the shaft 28.

At this time it is pointed out that for ease of adjusting the angular position of the sun gear 68, each stub shaft 60 will be provided with an aperture 140 for receiving a pin (not shown). The aperture 140 is preferably positioned between the two supports 58, as shown in FIG. 4. In a like manner, adjustment of the plates 108 is effected by providing the drive hub 118 with an aperture 142 for receiving a suitable pin or bar, as is also shown in FIG. 4.

When the feeder 20 is to be utilized for conveying articles, such as bottles and like containers, along the article supports 22, the flight bars 94 are provided with article engaging pins 144 which are suitably adjustable and removably secured to the flight bars. To facilitate the mounting of the pins 144 at various positions transversely of the feeder and along the length of each flight bar 94, each flight bar 94 is of an elongated slighted configuration as is best shown in FIGS. 1 and 6.

The article supports 22 will be of widths corresponding to the diameters or transverse dimensions of the articles being fed. The pins 144 will be mounted on the flight bars 94 in transversely spaced relation in accordance with the widths of the article supports 22 and the transverse dimensions of the articles being fed. The relationship of the pins 144 to containers 146 being conveyed is typically shown in FIG. 1.

It is to be understood that the flight bars 94 cannot hit the article supports 22. However, in their uppermost positions, they should closely underline the article supports 22. Further, it is to be understood that when one flight bar 94 is at its uppermost position, the pins 144 carried by adjacent flight bars should have their upper ends at least level with the upper surface of the article support 22 or projecting slightly up above. In this manner, an article is always disposed between two adjacent pins as it is being conveyed along the article support by the pins. It is to be understood that this relationship will determine the minimum length of the pins 144.

It is also pointed out here that when the spacing between adjacent flight bars 94 is adjusted, if the spacing is reduced, the highest position of the flight bar 94 is moved downwardly with respect to the article support 22. In a like manner, if the spacing is increased, the highest position of each flight bar 94 is moved upwardly with respect to the article support 22. In order that the highest position of the flight bars may be the same with respect to the article supports in all adjusted spacings of the flight bars 94, it is necessary that the relative positions of the feeder 20 and the article supports 22 be adjusted when the spacing of the flight bars 94 is adjusted. Since the article supports 22 are at a fixed elevation, it is therefore necessary to move or adjust the feeder 20. This is the purpose of the mounting of the feeder 20 on the pivotally mounted arms 30 and thus the feeder 20 may be vertically adjusted as is schematically illustrated in FIG. 3 as is required in accordance with the spacings of the flight bars 94.

Reference is now made to FIG. 2a wherein it will be seen that the pins 144 are widely adjusted on the flight bar 94 so as to handle relatively large bottles 146. It will also be seen that the article supports 22 are relatively wide.

When it is desired to feed or convey smaller bottles, such as the bottles 148 in FIG. 2b, the article supports, which are identified by the numeral 150, are narrower in accordance with the diameter of the bottles 148. In addition, the flight bars 94 will be adjusted so as to be more closely spaced. For example, if the flight bars 94 are adjusted for feeding the bottles 146 with the spacing shown in FIG. 5, they may be adjusted to the spacing B of FIG. 8 to handle the bottles 148. The pins 144 are transversely adjusted on the flight bars 94 in accordance with the diameters of the bottles 148. Also, it will be seen that the number of rows of bottles may be increased when the bottles are of smaller diameter.

Finally, with respect to FIG. 2c, there are illustrated bottles 152 which are still smaller. The article supports may again be replaced so that the bottles ride on article supports 154 which are relatively narrow. The pins 144 are adjusted in accordance with the diameters of the bottles 152 and while only four rows of bottles have been illustrated, it will be apparent that it is possible for six rows of bottles to be fed at the same time. Since the bottles are of a smaller diameter, the spacing of the flight bars 94 will be adjusted to be even smaller and may correspond to the spacing C of FIG. 9.

Although the feeder 20 has been specifically illustrated and described in conjunction with the feeding of containers, such as bottles, it is to be understood that the feeder is not so limited in application and can be utilized in almost any application where articles are to be continuously fed in sequence and wherein the spacing of the articles may be varied depending upon the size of articles being fed or the spacing between articles. Accordingly, reference is now made to FIG. 11 wherein there is illustrated a modified form of a feeder, generally identified by the numeral 220. Feeder 220 will be constructed identically with the feeder 20 and will be mounted in the same manner except instead of having received on article supports containers for movement thereby, the feeder 220 is utilized for the purpose of feeding blanks 222 from an overlying hopper 224. In addition, in lieu of the pins 144, there are provided pins 226 which have at their upper ends suction cups 228 or like feed elements.

The lowermost blank 222 in the hopper 224 will be engaged by a suction cup or cups carried by a flight bar 94 and will withdraw the same from the bottom of the hopper 224 and feed the same between a pair of feed rolls 230. Feed rolls 230 will then feed the blank to the right for further disposition.

Although only a preferred form of the feeder construction has been specifically illustrated and described herein, it is to be understood that minor variations may be made in the feeder construction without departing from the spirit and the scope of the invention, as defined by the appended claims.

I claim:

1. An infinitely variable spacing feeder comprising a carrier, means mounting said carrier for 360° rotation about an axia, a plurality of support elements, a feed member carried by each support element, support means carried by said carrier mounting said support elements on said carrier in uniformly spaced circumferential relation about said axis, and adjusting means carried by said carrier for adjusting said support means for adjusting the positions of said support elements radially of said axis and thereby varying the spacing between adjacent feed members, said support means including for each of said support elements a crank element, means mounting each support element on its respective crank element, means individually pivotally mounting each crank element on said carrier for facilitating movement of each support element towards and away from said axis, and said adjusting means being connected to each crank element for positioning said crank elements.

2. The feeder of claim 1 wherein said adjusting means includes a single actuator for simultaneously adjusting the positions of all of said support elements a like amount.

3. The feeder of claim 2 wherein said actuator is carried by said carrier for rotation about said axis relative to said carrier.

4. The feeder of claim 3 wherein said adjusting means includes for each crank element a pin carried by each crank element, an arcuate slot in said carrier and a slot in said actuator overlapping said carrier slot, and said pin extending through said slots.

5. An infinitely variable spacing feeder comprising a carrier, means mounting said carrier for 360° rotation about an axis, a plurality of support elements, a feed member carried by each support element, support means carried by said carrier mounting said support elements on said carrier in uniformly spaced circumferential relation about said axis, and adjusting means carried by said carrier for adjusting said support means for adjusting the positions of said support elements radially of said axis and thereby varying the spacing between adjacent feed members, orienting means carried by said carrier for maintaining a fixed orientation of each support element during the rotation of said support elements about said axis, said orientation means including means mounting each support element for rotation relative to its respective support means about an axis disposed parallel to said just mentioned axis, and means for effecting rotation of each support element at the same angular rate as said carrier.

6. An infinitely variable spacing feeder comprising a carrier, means mounting said carrier for 360° rotation about an axis, a plurality of support elements, a feed member carried by each support element, support means carried by said carrier mounting said support elements on said carrier in uniformly spaced circumferential relation about said axis, and adjusting means carried by said carrier for adjusting said support means for adjusting the positions of said support elements radially of said axis and thereby varying the spacing between adjacent feed members, orienting means carried by said carrier for maintaining a fixed orientation of each support element during the rotation of said support elements about said axis, said orientation means including a gear member connected to each support element and a gear train operatively connected to each gear member.

7. The feeder of claim 6 wherein said gear train includes a fixed sun gear centered on said axis.

8. The feeder of claim 6 wherein said support means includes for each support element a crank element, a shaft pivotally mounting each crank element on said carrier for movement of its respective support element towards and away from said axis, and each gear train including a gear rotatably journalled on said shaft and meshed with said gear member.

9. The feeder of claim 8 wherein said gear train includes a fixed sun gear centered on said axis.

10. An infinitely variable spacing feeder comprising a carrier, means mounting said carrier for 360° rotation about an axis, a plurality of support elements, a feed member carried by each support element, support means carried by said carrier mounting said support elements on said carrier in uniformly spaced circumferential relation about said axis, and adjusting means carried by said carrier for adjusting said support means for adjusting the positions of said support elements radially of said axis and thereby varying the spacing between adjacent feed member, there being two of said carriers mounted in spaced relation along said axis for rotation in unison, the second of said carriers also carrying a plurality of support elements, and said feed members including flight bars each extending between two opposed ones of said support elements.

11. The feeder of claim 10 wherein said flight bars carry article engaging elements.

12. The feeder of claim 10 together with an article support for articles to be fed, and means for relatively vertically adjusting said axis with respect to said article support in accordance with the adjustment of the positions of said support elements.

13. The feeder of claim 12 together with pins carried by said flight bars on opposite sides of said article supports, said pins being of a height wherein pins of at least two flight bars are always associated with said article support.

14. The feeder of claim 12 wherein said articles are in sheet form and said article support is a hopper.

15. The feeder of claim 6 wherein said gear train includes a normally fixed sun gear centered on said axis, and means for facilitating limited rotation of said sun gear for reorienting said support elements subsequent to an adjustment of the positions of said support elements.

* * * * *